US008924525B2

(12) United States Patent
Canterbury et al.

(10) Patent No.: US 8,924,525 B2
(45) Date of Patent: Dec. 30, 2014

(54) POWERING DEVICES IN WAGERING GAME MACHINES

(75) Inventors: Stephen A. Canterbury, Antioch, IL (US); Victor Mercado, Berwyn, IL (US)

(73) Assignee: WMS Gaming Inc., Waukegan, IL (US)

( * ) Notice: Subject to any disclaimer, the term of this patent is extended or adjusted under 35 U.S.C. 154(b) by 1655 days.

(21) Appl. No.: 12/090,330

(22) PCT Filed: Oct. 26, 2006

(86) PCT No.: PCT/US2006/041757

§ 371 (c)(1), (2), (4) Date: Apr. 15, 2008

(87) PCT Pub. No.: WO2007/053417

PCT Pub. Date: May 10, 2007

(65) Prior Publication Data

US 2008/0280664 A1 Nov. 13, 2008

Related U.S. Application Data

(60) Provisional application No. 60/732,116, filed on Nov. 1, 2005.

(51) Int. Cl.
*G06F 15/173* (2006.01)
*G07F 17/32* (2006.01)

(52) U.S. Cl.
CPC .................................... *G07F 17/32* (2013.01)
USPC ........................................ 709/223; 709/224

(58) Field of Classification Search
CPC ........ G07F 17/32; G07F 17/3241; G07F 9/02
USPC .............. 709/204–206, 223, 224; 463/16–22, 463/40–42
See application file for complete search history.

(56) References Cited

U.S. PATENT DOCUMENTS

| | | | | |
|---|---|---|---|---|
| 6,575,833 | B1 * | 6/2003 | Stockdale | 463/29 |
| 6,755,742 | B1 * | 6/2004 | Hartman et al. | 463/40 |
| 6,812,824 | B1 * | 11/2004 | Goldinger et al. | 340/10.1 |
| 7,081,827 | B2 * | 7/2006 | Addy | 340/693.2 |
| 7,233,247 | B1 * | 6/2007 | Crossno et al. | 340/572.1 |
| 7,295,114 | B1 * | 11/2007 | Drzaic et al. | 340/572.1 |
| 7,671,741 | B2 * | 3/2010 | Lax et al. | 340/572.1 |
| 7,890,777 | B2 * | 2/2011 | Diab | 713/300 |
| 8,057,302 | B2 * | 11/2011 | Wells et al. | 463/29 |
| 2004/0111755 | A1 * | 6/2004 | Perlman | 725/133 |
| 2005/0229016 | A1 * | 10/2005 | Addy | 713/300 |
| 2006/0189388 | A1 * | 8/2006 | Hartman et al. | 463/42 |
| 2007/0060362 | A1 * | 3/2007 | Osgood et al. | 463/42 |

(Continued)

OTHER PUBLICATIONS

"International Search Report for Application No. PCT/US2006/41757, date mailed Mar. 23, 2007", 4 pgs.
"Written Opinion of the International Searching Authority for Application No. PCT/US2006/41757, date mailed Mar. 23, 2007", 7 pgs.

*Primary Examiner* — Mohamed Wasel
(74) *Attorney, Agent, or Firm* — Nixon Peabody LLP

(57) ABSTRACT

Method, apparatus, and system of powering gaming machine devices over an Ethernet connection. A Power-over-Ethernet (PoE) connection point communicates with and powers a PoE device performing operations for a wagering game presented on the gaming machine. The PoE connection point and PoE device are powered by a different power source than the gaming machine and continue operating and communicating after the gaming machine power source fails.

17 Claims, 9 Drawing Sheets

(56) References Cited

U.S. PATENT DOCUMENTS

2008/0248878 A1* 10/2008 Yoshioka ........................ 463/42
2009/0118017 A1* 5/2009 Perlman et al. ................. 463/42
2009/0212920 A1* 8/2009 Yang ............................ 340/10.3
2010/0007334 A1* 1/2010 Apfel ........................ 324/123 R
2010/0167816 A1* 7/2010 Perlman et al. ................. 463/30

* cited by examiner

POWERING DEVICES IN WAGERING GAME MACHINES

RELATED APPLICATIONS

This patent application is a U.S. National Stage Filing under 35 U.S.C. 371 from International Patent Application Serial No. PCT/US2006/041757, filed Oct. 26, 2006, and published on May 10, 2007 as WO 2007/053417 A1, which claims the priority benefit of U.S. Provisional Patent Application Ser. No. 60/732,116, filed Nov. 1, 2005 and entitled "POWERING DEVICES IN WAGERING GAME MACHINES" by inventors Stephen A. Canterbury and Victor Mercado, the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

FIELD

This invention relates generally to the field of wagering game devices and more particularly to the field of providing power to wagering game devices.

BACKGROUND

A wide variety of computerized wagering game machines (a.k.a. gaming machines) are now available to casino operators and players. Computerized wagering game machines range from slot machines to games that are traditionally played live, such as poker, blackjack, roulette, etc. These computerized gaming machines provide many benefits to game owners and players, including increased reliability over mechanical machines, greater game variety, improved sound and animation, and lower overall management cost.

Wagering game machines typically include power supplies that provide power to their central processing units (CPU) and peripheral devices. For example, a wagering game machine's bill validator typically processes currency and performs other operations using power from the wagering game machine's internal power supply. Typically, if the wagering game machine's internal power supply is not plugged into a wall socket, the CPU and peripheral devices will not have power needed for performing gaming machine operations. If the CPU is not running, most peripheral devices are not needed. However, some peripheral devices may be needed even when the gaming machine's internal power supply cannot provide power to the CPU and other peripheral devices.

SUMMARY

Systems, methods, and apparatus for powering devices in wagering game machines are described herein. In one embodiment, the system includes a wagering game machine including a PoE device and a central processing unit. The system can also include a network device configured to transmit data destined for the PoE capable device. Additionally, the system can include a power source to provide power and a PoE connection point configured to receive the data and the power and configured to transmit the data and the power over an Ethernet connection to the PoE device of the wagering game machine.

In one embodiment, the method can include receiving, over an Ethernet connection, communications and power in a PoE device, where the PoE device disposed inside a wagering game machine. The method can also include using the power and communications to perform wagering game machine operations.

BRIEF DESCRIPTION OF THE FIGURES

The present invention is illustrated by way of example and not limitation in the Figures of the accompanying drawings in which.

DESCRIPTION OF THE EMBODIMENTS

Systems, methods, and apparatus for powering devices in wagering game machines are described herein. This description of the embodiments is divided into five sections. The first section provides some example architectures in which wagering game devices can utilize PoE for powering wagering game machine devices. The second section describes example operations performed by some embodiments of the example architectures, while the third section describes an example implementation. The fourth section describes an example wagering game machine, whereas the fifth section provides some general comments.

Example Gaming Devices

This section provides some example architectures in which gaming devices utilize Power-over-Ethernet ("PoE") for powering wagering game machine devices. In some embodiments, the PoE devices described below transmit/receive power and data over standard Ethernet cabling according to the IEEE 802.3af standard, which is hereby incorporated by reference. This section will describe FIGS. 1-3.

Figure 1:
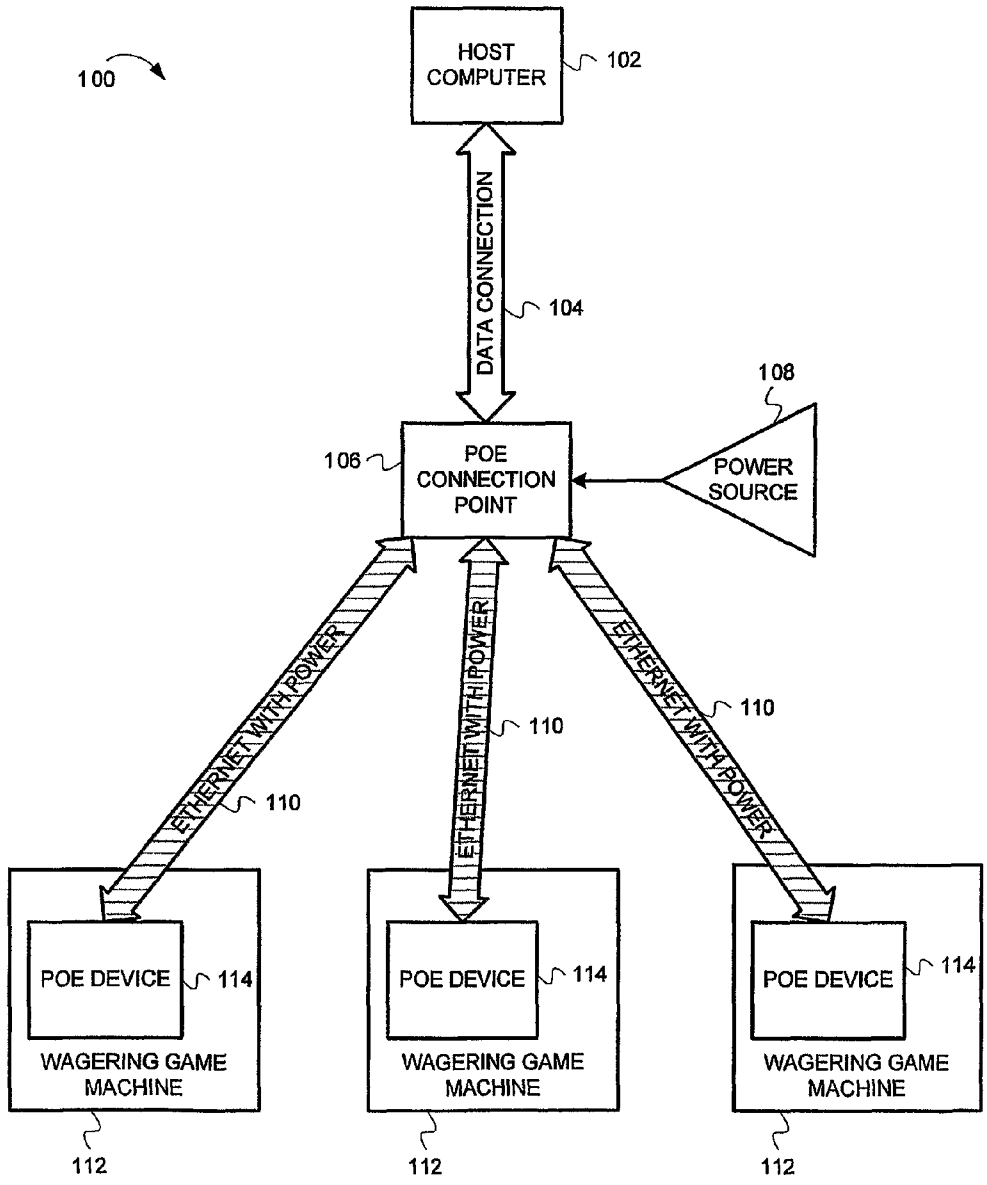
FIG. 1 is a block diagram illustrating wagering game network connection point that transmits data and power to devices in a wagering game network, according to example embodiments of the invention.

FIG. 1 is a block diagram illustrating wagering a game network connection point that transmits data and power to devices in a wagering game network, according to example embodiments of the invention. As shown in FIG. 1, the wagering game network 100 includes a host computer 102 connected to a PoE connection point 106 over a data connection 104. The data connection 104 can include any suitable transmission medium capable of conducting communications according to Ethernet, universal serial bus (USB), RS-232, or other suitable communication protocols.

The PoE connection point 106 receives power from a power source 108. The power source 108 can include an alternating current power source, such as a wall socket, generator, etc. Alternatively, the power source 108 can include a battery or other suitable direct current power source.

The PoE connection point 106 can be connected to one or more PoE devices 114, which are disposed inside the wagering game machines 112. In one embodiment, one or more of the PoE devices 114 can be standalone gaming network devices that are not connected to wagering game machines. In one embodiment, the PoE connection point 106 can transmit both data and power to the PoE devices 114 over communication media 110. The communication media 110 can include any media capable of conducting Ethernet communications (e.g., category 5 cables).

Because the PoE devices 114 can receive power from the PoE connection point 106, the PoE devices 114 can operate even if the wagering game machines 112 do not have power. For example, when a wagering game machine 112 is not plugged into a wall socket, a PoE device 114 can operate using power from the PoE connection point 106.

Figure 2:
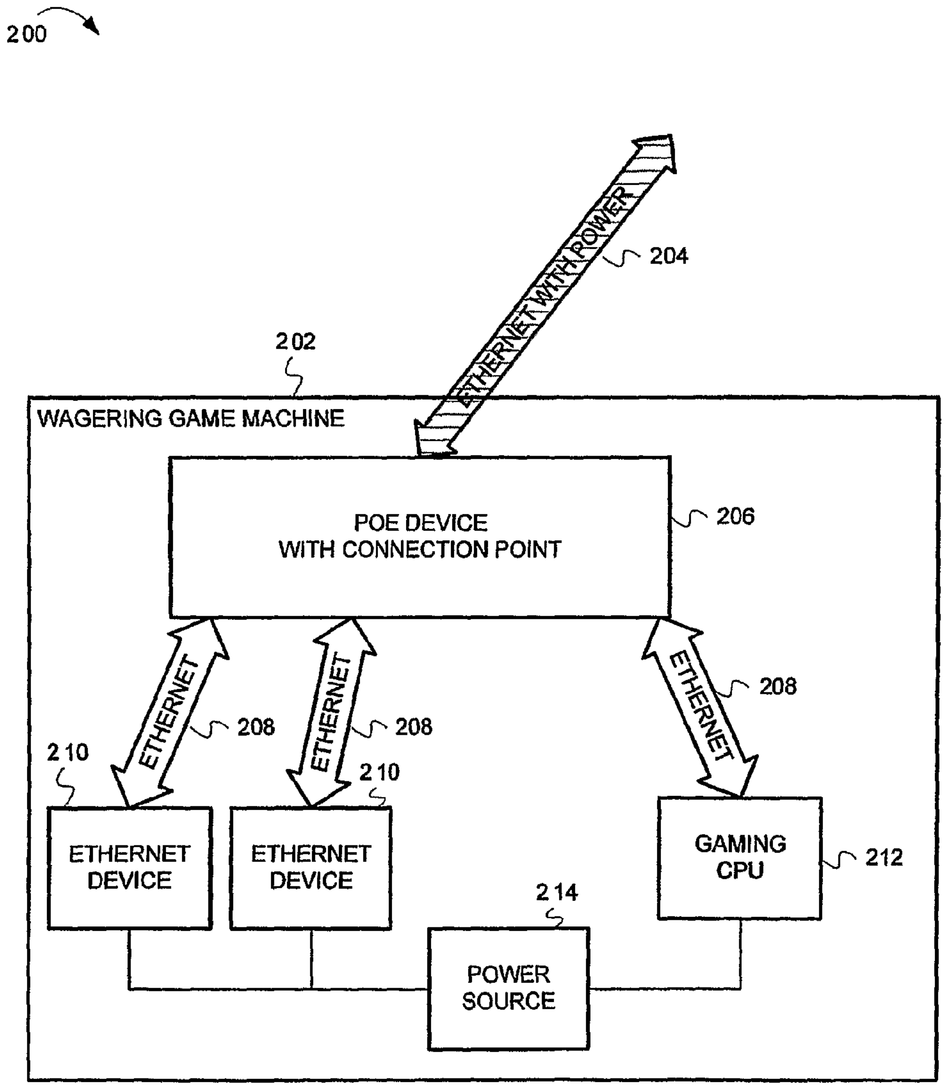
FIG. 2 is a block diagram illustrating a wagering game machine including a PoE powered connection point, according to example embodiments of the invention.

This description continues with FIG. 2.

FIG. 2 is a block diagram illustrating a wagering game machine including a PoE device with connection point, according to example embodiments of the invention. As shown in FIG. 2, the wagering game machine 202 includes a PoE device with connection point 206, Ethernet devices 210, CPU 212, and power source 214. The PoE device with connection point 206 is connected to the Ethernet devices 210 and CPU 212 via connection media 208, which can be any media suitable for conducting Ethernet communications (e.g. category 5 cable). In one embodiment, the Ethernet devices 210 and CPU 212 are powered by the power source 214, which can receive its power from a wall socket or generator.

The PoE device with connection point 206 is also connected via connection medium 204 (e.g., a category 5 cable) to a host computer or other network device (not shown). In one embodiment, the PoE device with connection point 206 can receive both data and power over the connection medium 204. As a result, the PoE device with connection point 206 can operate without receiving power from the wagering game machine's power source 214.

In one embodiment, the PoE device with connection point 206 includes logic for operating as a PoE peripheral device, such as a PoE camera. Additionally, the PoE device with connection point 206 can include logic for forwarding data to the Ethernet devices 210 and/or CPU 212. Thus, the PoE device with connection point 206 can facilitate communications between the Ethernet devices 210 and network devices (e.g., a host computer), where the communications occur without assistance from the CPU 212. Furthermore, the PoE connection point can enable the plurality of the Ethernet devices 210 to communicate with a network devices through a single cable, thus reducing the wagering game machine's communication cabling fan-in to a single cable.

Figure 3:
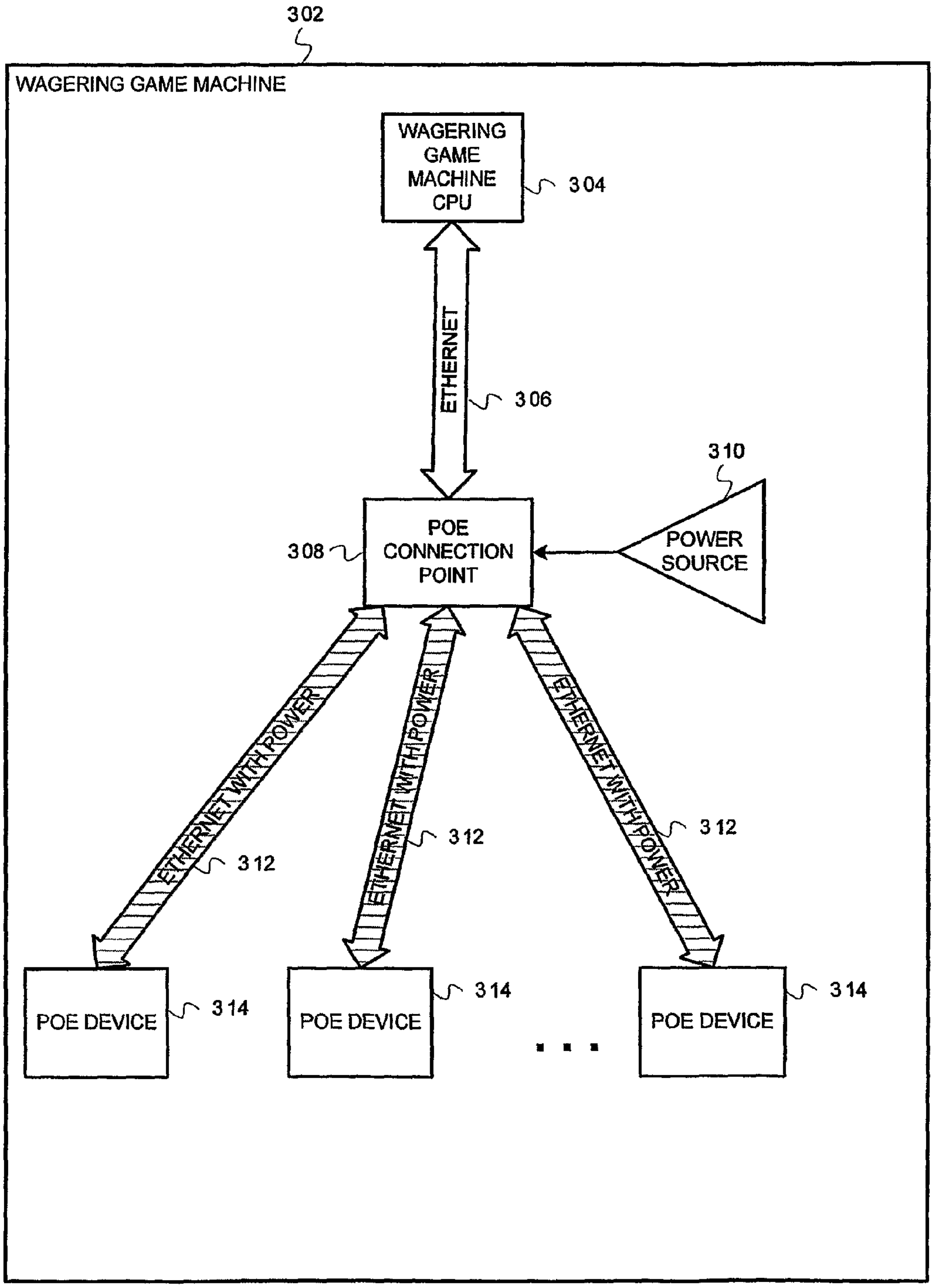
FIG. 3 is at block diagram illustrating a wagering game machine in which power can be distributed over Ethernet connections, according to example embodiments of the invention.

While FIGS. 1 and 2 describe connection points that are located outside wagering game machines, FIG. 3 describes connection points that are located inside wagering game machines. This description continues with FIG. 3.

FIG. 3 is at block diagram illustrating a wagering game machine in which power can be distributed over Ethernet connections inside a wagering game machine, according to example embodiments of the invention. As shown in FIG. 3, the wagering game machine 302 includes a CPU 304 connected to a PoE connection point 308. In one embodiment, the CPU 304 and PoE connection point 308 can be connected using any medium suitable for conducting Ethernet communications.

The PoE connection point 308 can be connected to an external network (not shown) via any suitable medium (e.g., Ethernet, RS-232, USB, etc.). Additionally, the PoE connection point 308 is connected to and receives power from a power source 310. The power source 310 can include an alternating current power source, such as a wall socket, generator, etc., or a battery or other suitable direct current power source.

The PoE connection point 308 is also connected to PoE devices 314. The PoE connection point 308 can transmit power and data to one or more PoE devices 314, which can include any suitable wagering game machine peripheral devices, such as bill validators, card readers gaming voucher scanners etc. Because the PoE devices 314 can receive power from the PoE connection point 308, the PoE devices 314 do not require separate power supplies and power cabling. As a result, the PoE connection point 308 can facilitate a reduction in the number of power cables and peripheral device power supplies (e.g., DC power adaptors). Having fewer power cables and peripheral device power supplies in the wagering game machine's cabinet can allow for smaller cabinets, more peripheral devices, and more working space.

Operations performed by embodiments of the gaming device are described in the next section.

System Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., digital logic). In the following discussion, FIG. 4 describes operations for delivering power and data to wagering game devices over Ethernet connections, while FIG. 5 describes operations for using the power and data. This description will proceed with a discussion of FIG. 4.

Figure 4:
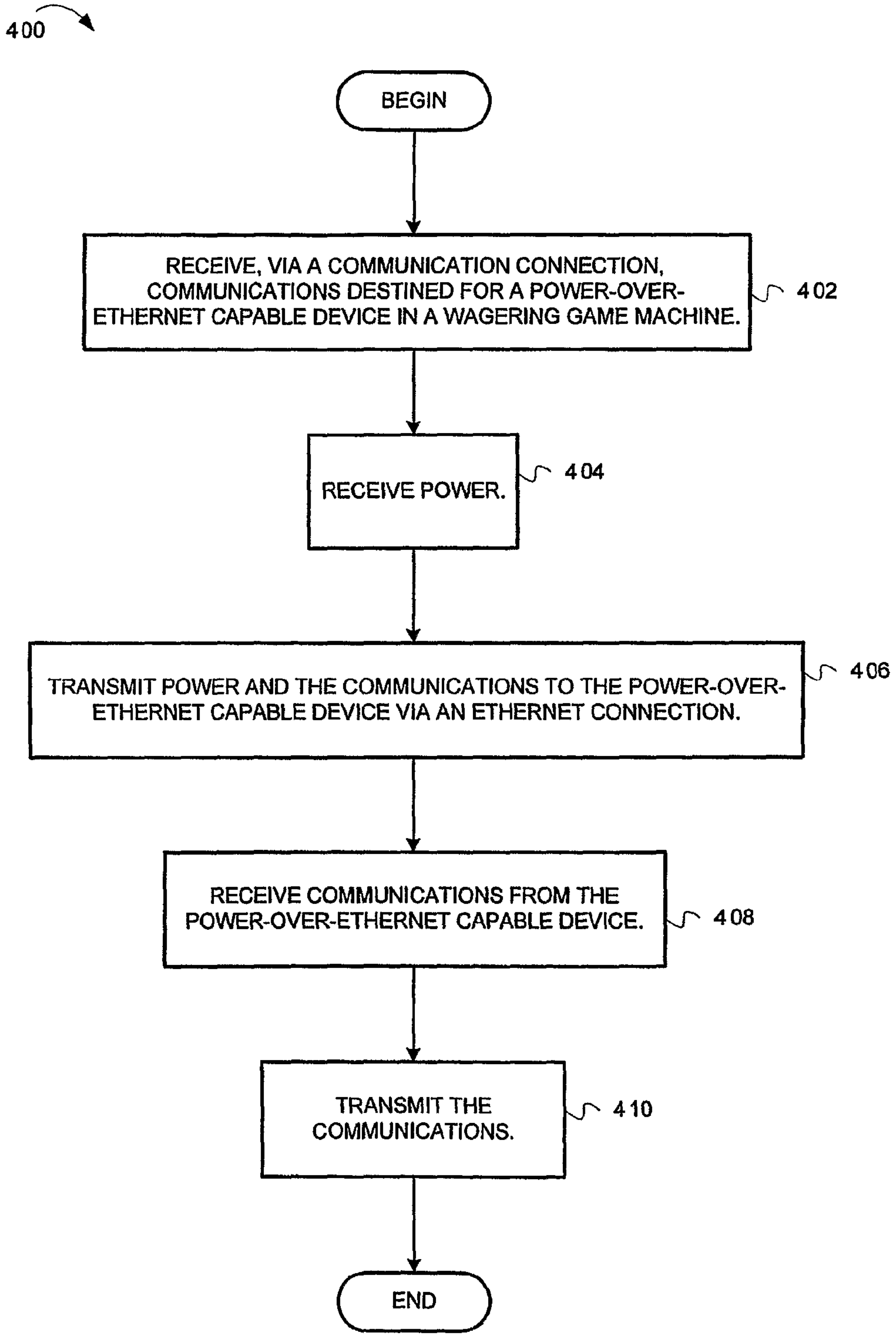
FIG. 4 is a flow diagram illustrating operations for delivering power and data to PoE wagering game devices, according to example embodiments of the invention.

FIG. 4 is a flow diagram illustrating operations for delivering power and data to PoE wagering game devices, according to example embodiments of the invention. The flow diagram 400 begins at block 402.

At block 402, communications destined for a PoE device are received. For example, the PoE connection point 106 receives communications from the host computer 102, were the communications are destined for one or more of the PoE devices 114. The flow continues at block 404.

At block 404, power is received. For example, the PoE connection point 106 receives power from the power source 108. The flow continues at block 406.

At block 406, the power and communications are transmitted to one or more PoE devices. For example, the PoE connection point 106 transmits the power and communications to one or more of the PoE devices 114. The transmission occurs over the transmission medium 110. The flow continues at block 408.

At block 408, communications are received from one or more of the PoE devices. For example, the PoE connection point 106 receives communications from one or more of the PoE devices 114, were the communications are destined for the host computer 102. The flow continues at block 410.

At block 410, the communications are transmitted on through the network. For example, the PoE connection point 106 transmits the communications to the host computer 102. From block 410, the flow ends.

Although the flow diagram 400 is described with reference to the embodiment shown in FIG. 1, the embodiments of FIG. 3 (and other embodiments) can perform similar operations. Additionally, some embodiments omit the operations at blocks 408 and/or 410. This description continues with the discussion of operations for using the power and communications provided in FIG. 4. This description proceeds with FIG. 5.

Figure 5:
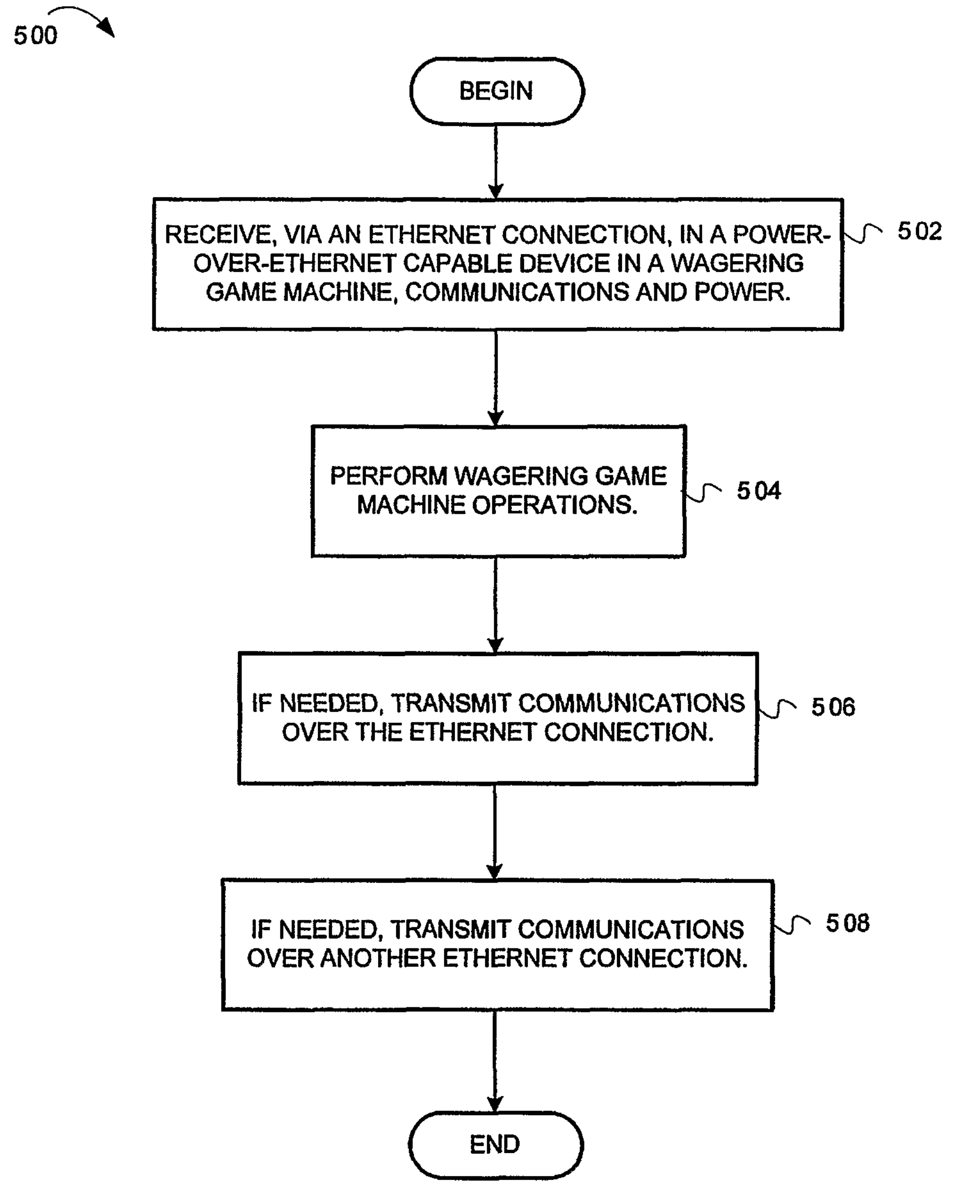
FIG. 5 is a flow diagram illustrating operations for using power and communications received in a wagering game machine PoE device over an Ethernet connection, according to example embodiments of the invention.

FIG. 5 is a flow diagram illustrating operations for using power and communications received in a wagering game machine PoE device over an Ethernet connection, according to example embodiments of the invention. The flow diagram 500 commences at block 502.

At block 502, communications and power are received in a PoE device in a wagering game machine. For example, the PoE device 114 receives communications and power from the PoE connection point 106. In one embodiment, the communications are received over the communication medium 110, which is capable of conducting Ethernet communications. The flow continues at block 504.

At block 504, wagering game operations are performed. For example, the PoE device 114 performs wagering game operations, such as validating currency, monitoring wagering game machine security (see discussion of FIG. 8), printing tickets, etc. The flow continues at block 506.

At block 506, if needed, communications are transmitted over an Ethernet connection. For example, if needed, the PoE device 114 transmits communications over the communication medium 110 to the host computer 102. The flow continues at block 508.

At block 508, if needed, communications are transmitted over another Ethernet connection within the wagering game machine. For example, in an embodiment in which the PoE device can act as a connection point (see block 206 of FIG. 2), the device transmits communications over another Ethernet connection (e.g., 208) to another device located inside the wagering a machine. From block 508, the flow ends.

While this section described operations performed by embodiments of the invention, the next section describes an exemplary implementation according to embodiments of the invention.

Example Implementation

This section presents an example implementation, according to embodiments of the invention. In particular, this section describes a wagering game security system that is not connected to the wagering game machine's CPU and that does not receive power from the wagering game machine's power source.

Figure 6:
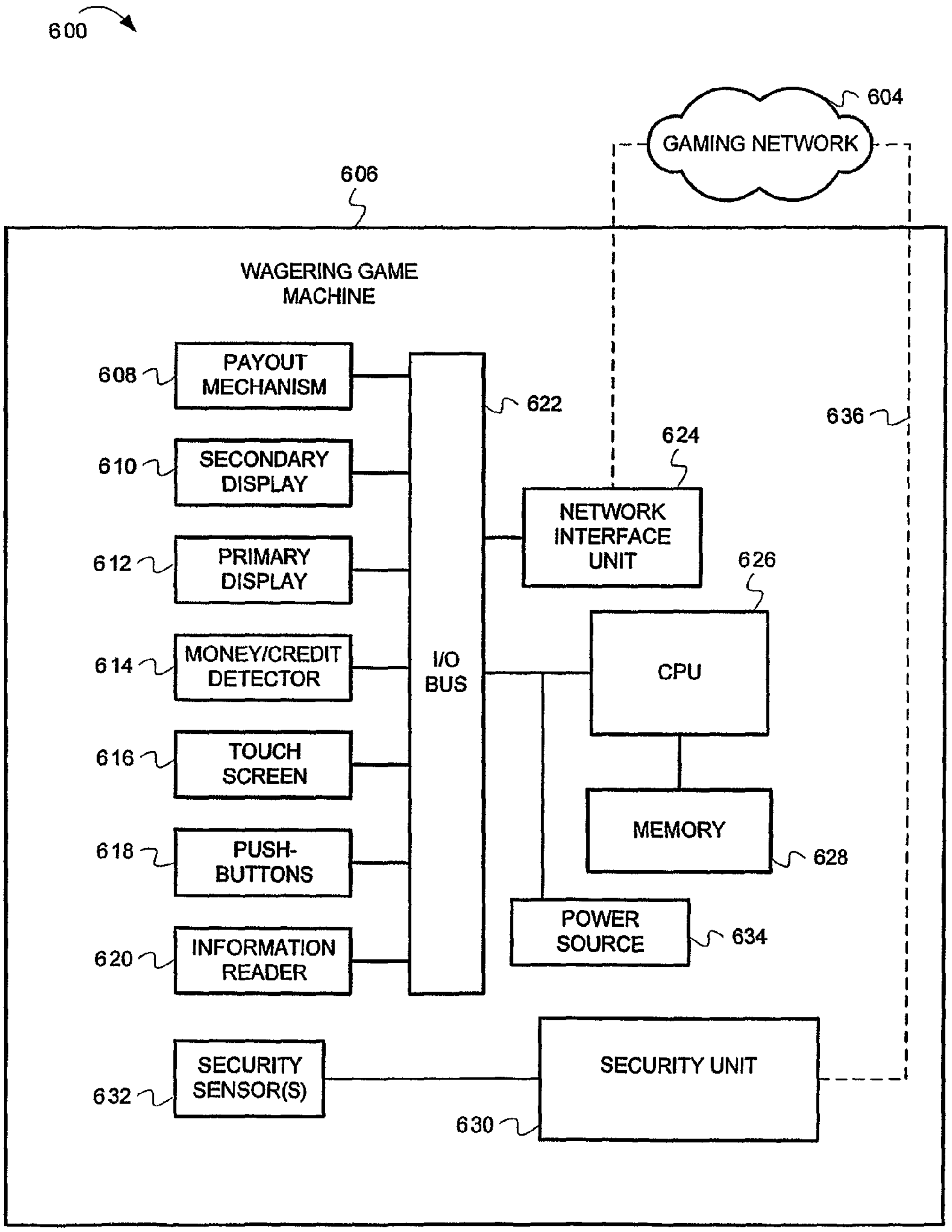
FIG. 6 is a block diagram illustrating a wagering game machine including security devices, according to example embodiments of the invention.

FIG. 6 is a block diagram illustrating a wagering game machine including security devices, according to example embodiments of the invention. As shown in FIG. 6, the wagering game machine 606 includes a central processing unit (CPU) 626, which is connected to an input/output (I/O) bus 622. The I/O bus 622 is connected to a network interface unit 624, which is connected to a gaming network 604. The network interface unit 624 can transmit and receive communications according to any suitable protocol, such as Ethernet, 802.11, DSL, etc. The I/O bus 622 is also connected to payout mechanism 608, secondary display 610, primary display 612, money/credit detector 614, touchscreen 616, push-buttons 618, and information reader 620. The CPU 626 is also connected to a memory unit 628, which can include instructions for conducting wagering games.

The wagering game machine 606 also includes a security control unit 630, which is connected to one or more security sensors 632. The security control unit 630 is connected to the gaming network 604 via connection medium 636 (e.g., a medium suitable for conducting Ethernet communications. In one embodiment, the security sensors 632 can include cameras, motion sensors, door sensors, and any other device suitable for enhancing security of the wagering to a machine 606. In one embodiment, the security control unit 630 and security sensors 632 can be integrated into a single device.

The power source 634 supplies power to the CPU 626, memory 628, and other devices to which it is connected. As shown in FIG. 6, the security control unit 630 and security sensors 632 are not connected to the wagering game machine's CPU 626 or power source 634. As a result, the security control unit 630 and security sensors 632 can operate independently of the wagering game machine's CPU 626 and power source 634. In one embodiment, the security control unit 630 can receive power over an Ethernet connection, where the power is received from a connection point (not shown) located in the gaming network 604. In another embodiment, the security control unit 630 receives power from an independent power source (not shown) and includes logic for distributing the power to the security sensors 632 over Ethernet connections (see FIG. 2). In yet another embodiment, the security control unit 630 and/or security sensors 632 receive power from an AC or DC power source (not shown) external to the wagering game machine 606, where the power source does not supply power for use by other components of the wagering game machine 606. Because the security control unit 630 and security sensors 632 do not receive power from the wagering game machine's power source, they can continue monitoring security even if the wagering game machine's power source is not connected to a wall socket.

According to some embodiments, the wagering game machine 606 can include additional peripheral devices and/or more than one of each component shown in FIG. 6. For example, in one embodiment, the wagering game machine 606 can include multiple CPUs 626. Additionally, the components of the wagering game machine 606 can be interconnected according to any suitable interconnection architecture (e.g., directly connected, hypercube, etc.).

This description continues with a discussion of operations performed by the embodiments discussed vis-à-vis FIG. 6. The description continues with a discussion of FIG. 7.

Figure 7:
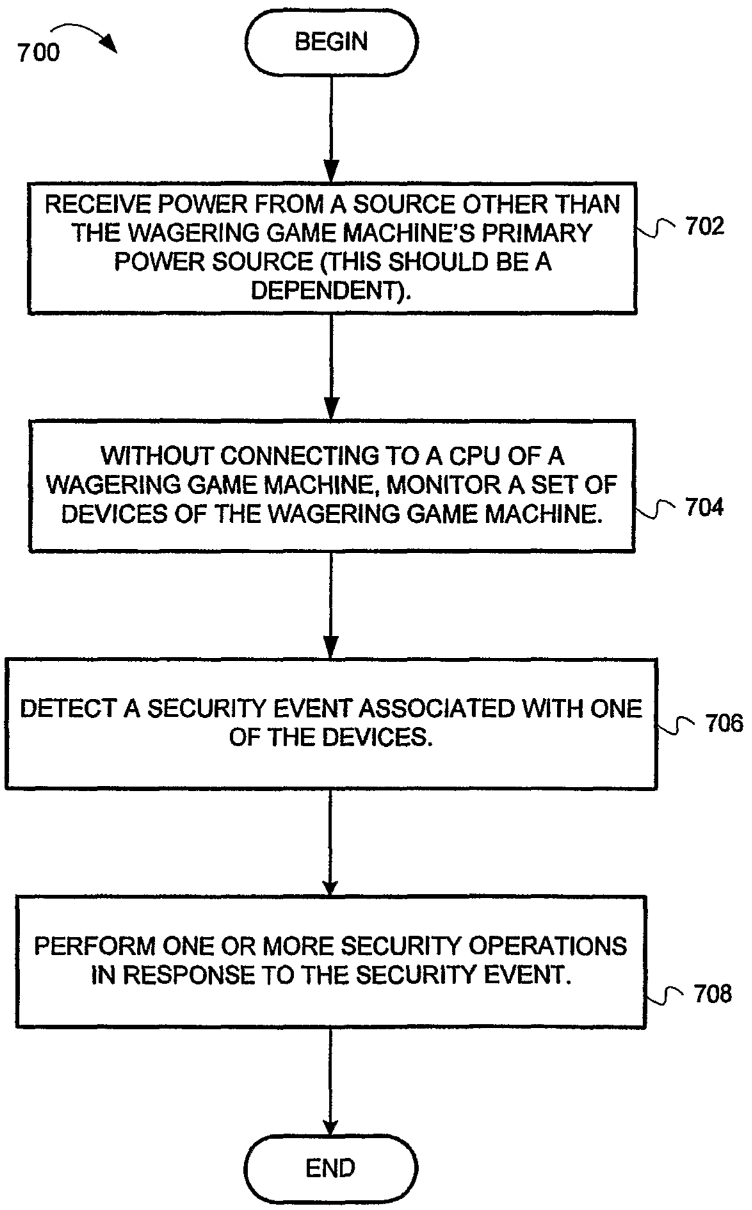
FIG. 7 is a flow diagram illustrating operations performed by a security control unit, according to example embodiments of the invention.

FIG. 7 is a flow diagram illustrating operations performed by a security control unit, according to example embodiments of the invention. The flow diagram 700 will be described with reference to the embodiments shown in FIG. 6. The flow begins at block 702.

At block 702, power is received from a source other than a wagering game machine's power source. For example, the security control unit 630 receives power from a power source other than the wagering game machine's power source 634. In one embodiment, the security control unit 630 can receive power from a battery pack (not shown) located inside the wagering game machine 606. Alternatively, the security control unit 630 can receive power from a PoE connection point located on the gaming network 604, wherein the power is received over the Ethernet connection 636. The flow continues at block 704.

At block 704, without a connection to the wagering game machine's central processing unit, a set of sensors/devices are monitored. For example, without a connection to the CPU 626, the security control unit 630 monitors the security sensors 632. Because the security control unit 630 does not have a connection to the CPU 626, the security control unit 630 can operate independently of and without assistance from the CPU 626.

At block 706, a security event is detected. For example, the security control unit 630 detects a security event (e.g., an open cabinet door) based on input from the security sensors 632. The flow continues at block 708.

At block 708, one or more security operations are performed in response to the security event. For example, in response to the security event, the security control unit 630 performs one or more security operations. Security operations are described in more detail below, in the discussion of FIG. 8. From block 708, the flow ends.

This description continues with a more detailed discussion of security operations that can be performed by embodiments of the invention. The security operations are described below, in a discussion of FIG. 8.

Figure 8:
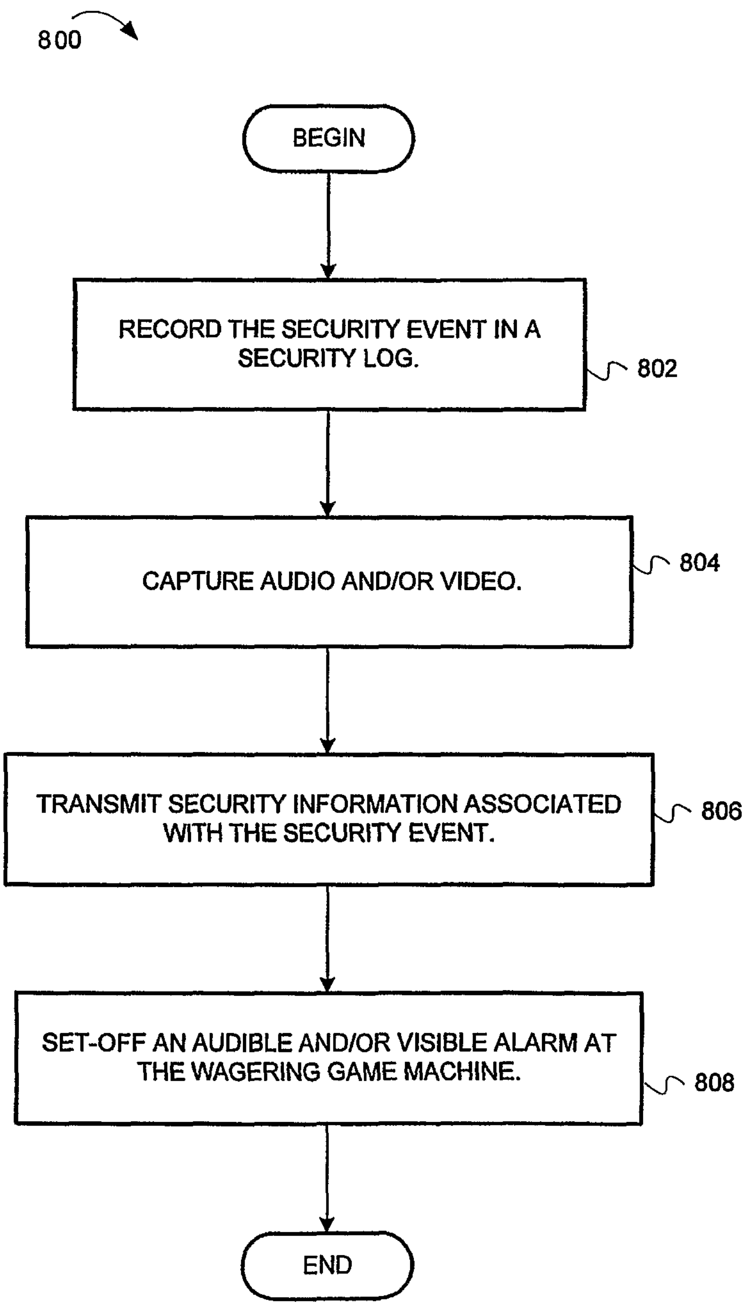
FIG. 8 is a flow diagram illustrating security operations, according to example embodiments of the invention.

FIG. 8 is a flow diagram illustrating security operations, according to example embodiments of the invention. The flow diagram 800 begins at block 802.

At block 802, a security event is recorded in a security log. For example, after detecting a security event (see block 706), the security control unit 630 records the security event in a security log (not shown). The flow continues at block 804.

At block 804, audio and/or video is captured. For example, the security control unit 630 records events in and around the wagering game machine 606 by capturing audio and/or video. In one embodiment, the security control unit 630 uses the security sensors 632 for capturing the audio and/or video. The flow continues at block 806.

At block 806, security information associated with the security event is transmitted. For example, the security control unit 630 transmits security information associated with the security event to a host computer or other network device located on the gaming network 604. The flow continues at block 808.

At block 808, an audible and/or visible alarm is set-off. For example the security control unit 630 sets-off sirens and/or lights in and around the wagering game machine 606. From block 808, the flow ends.

Example Wagering Game Machine

This section describes an example wagering game machine with which embodiments of the invention can be practiced. This description continues with FIG. 9.

Figure 9:
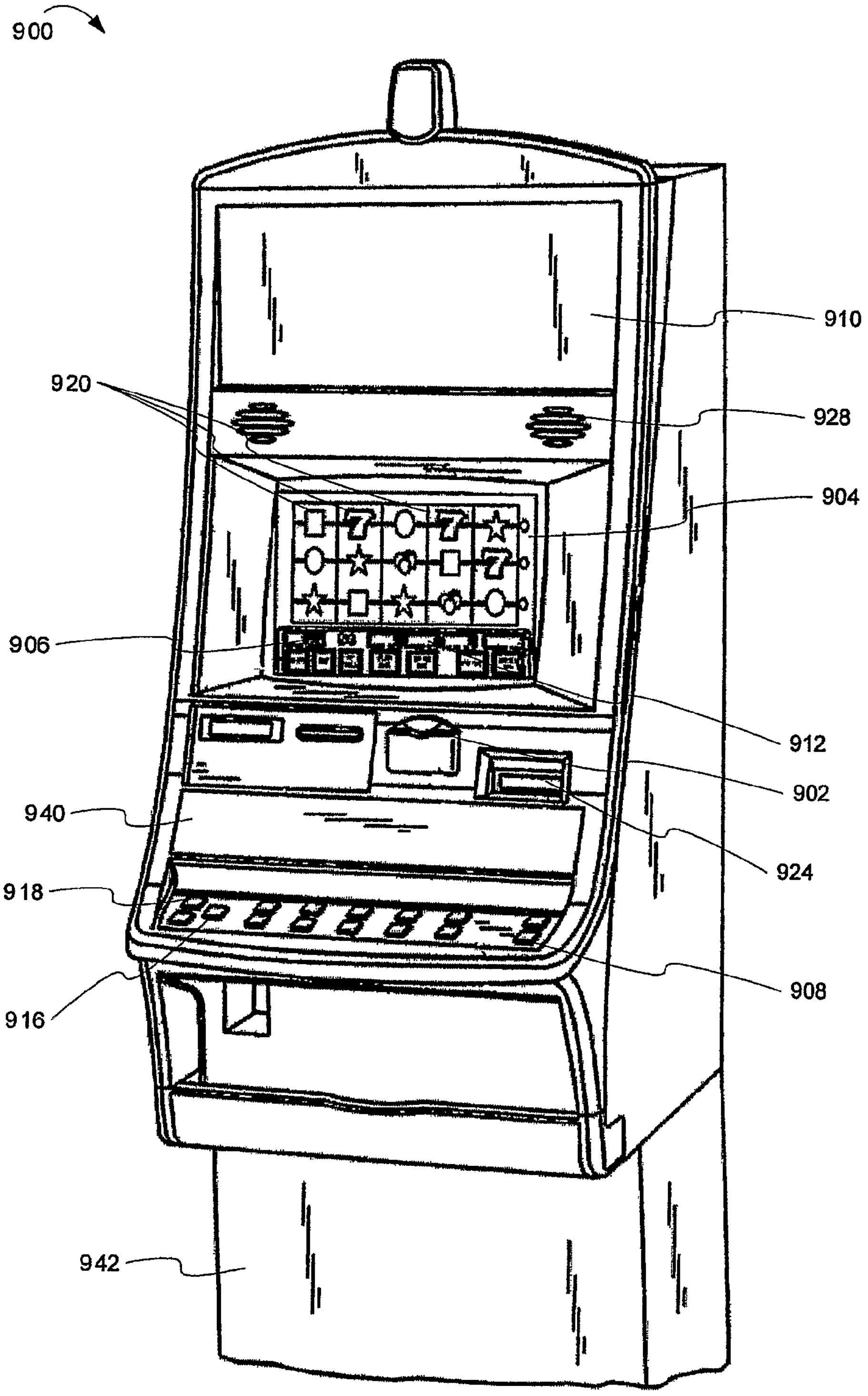
FIG. 9 is a perspective view of a wagering game machine, according to example embodiments of the invention.

FIG. 9 is a perspective view of a wagering game machine, according to example embodiments of the invention. As shown in FIG. 9, the wagering game machine 900 can be a computerized slot machine having the controls, displays, and features of a conventional slot machine.

The wagering game machine 900 can be mounted on a stand 942 or it can be constructed as a pub-style tabletop game (not shown). As a result, the wagering game machine 900 can be operated while players are standing or seated. Furthermore, the wagering game machine 900 can be constructed with varying cabinet and display designs. The wagering game machine 900 can incorporate any primary game such as slots, poker, or keno, and additional bonus round games. The symbols and indicia used on and in the wagering game machine 900 can take mechanical, electrical, or video form.

As illustrated in FIG. 9, the wagering game machine 900 includes a coin slot 902 and bill acceptor 924. Players can place coins in the coin slot 902 and paper money or ticket vouchers in the bill acceptor 924. Other devices can be used for accepting payment. For example, credit/debit card readers/validators can be used for accepting payment. Additionally, the wagering game machine 900 can perform electronic funds transfers and financial transfers to procure monies from financial accounts. When a player inserts money in the wagering game machine 900, a number of credits corresponding to the amount deposited are shown in a credit display 906. After depositing the appropriate amount of money, a player can begin playing the game by pushing play button 908. The play button 908 can be any play activator used for starting a wagering game or sequence of events in the wagering game machine 900.

As shown in FIG. 9, the wagering game machine 900 also includes a bet display 912 and one or more "bet" buttons on the panel 916. The player can place a bet by pushing one or more of the bet buttons on the panel 916. The player can increase the bet by one or more credits each time the player pushes a bet button. When the player pushes a "bet one" button 916, the number of credits shown in the credit display 906 decreases by one credit, while the number of credits shown in the bet display 912 increases by one credit.

A player may end the gaming session or "cash-out" by pressing a cash-out button 918. When a player cashes-out, the wagering game machine 900 dispenses a voucher or currency corresponding to the number of remaining credits. The wagering game machine 900 may employ other payout mechanisms such as credit slips (which are redeemable by a cashier) or electronically recordable cards (which track player credits), or electronic funds transfer.

The wagering game machine also includes a primary display unit 904 and a secondary display unit 910 (also known as a "top box"). The wagering game machine may also include an auxiliary video display 940. In one embodiment, the primary display unit 904 displays a plurality of video reels 920. According to embodiments of the invention, the display units 904 and 910 can include any visual representation or exhibition, including moving physical objects (e.g., mechanical reels and wheels), dynamic lighting, and video images. In one embodiment, each reel 920 includes a plurality of symbols such as bells, hearts, fruits, numbers, letters, bars or other images, which correspond to a theme associated with the wagering game machine 900. Additionally, the wagering game machine 900 also includes an audio presentation unit 928. The audio presentation unit 928 can include audio speakers or other suitable sound projection devices.

Any of the wagering game machine's components can include machine-readable media including instructions for executing operations described herein. Machine-readable media includes any mechanism that provides (i.e., stores and/or transmits) information in a form readable by a machine (e.g., a computer). For example, tangible machine-readable media includes semiconductor read only memory (ROM), semiconductor random access memory (RAM), magnetic disk storage media, optical storage media, flash memory devices, or any other suitable tangible media for providing instructions and/or data.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A gaming machine comprising:
- one or more processors powered by a first power source;
- one or more memory devices storing instructions that, when executed by at least one of the one or more processors, cause the one or more processors to present a wagering game that includes receiving a wager;
- a Power-Over-Ethernet (PoE) connection point powered by a second power source and communicably connected to at least one of the one or more processors;
- at least one PoE device configured to perform money-handling operations for the wagering game, the at least one PoE device communicably connected to and receiving power from the PoE connection point via Ethernet connection media;
- wherein the at least one PoE device performs the money-handling operations and communicates money-handling information to the at least one of the one or more processors via the PoE connection point while the one or more processors are powered by the first power source, and performs at least a part of the money-handling operations and communicates money-handling information to the PoE connection point in the event of a failure of the first power source.

2. The gaming machine of claim 1, wherein the money-handling operations include at least one of currency validation and ticket printing.

3. The gaming machine of claim 1, wherein the PoE connection point is further communicably connected to a gaming network and communicates money-handling information to the gaming network.

4. The gaming machine of claim 1, wherein the PoE connection point receives alternating-current (AC) power from the second power source.

5. The gaming machine of claim 1, wherein the PoE connection point receives direct-current (DC) power from the second power source.

6. The gaming machine of claim 1, wherein, after the failure of the first power source, the at least one PoE device communicates with the PoE connection point via an Ethernet protocol.

7. The gaming machine of claim 1, wherein the at least one PoE device further transmits communications to different component of the gaming machine.

8. The gaming machine of claim 1, further comprising a security device communicably connected to and receiving power from the PoE connection point, wherein the security device performs security operations and communicates security event information to the PoE connection point after the failure of the first power source.

9. A gaming system comprising:
- a host computer;
- a plurality of gaming machines, each gaming machine of the plurality including one or more processors powered by a first power source, each gaming machine of the plurality being configured to present, via at least one of the respective one or more processors, a wagering game that includes receiving a wager, each gaming machine of the plurality further including at least one PoE device configured to perform money-handling operations for the respective wagering game; and
- a Power-over-Ethernet (PoE) connection point powered by a second power source, the PoE connection point being communicably connected to the host computer, and being communicably connected to and delivering power to each PoE device via Ethernet connection media, wherein each PoE device performs the money-handling operations and communicates money-handling information to the host computer via the PoE connection point while the one or more processors are powered by the first power source, and performs at least a part of the money-handling operations and communicates money-handling information to the PoE connection point in the event of a failure of the first power source.

10. The gaming system of claim 9, wherein the PoE connection point receives communications that are destined for the host computer from one or more of the PoE devices of the gaming machines of the plurality.

11. The gaming system of claim 9, wherein the money-handling operations include at least one of currency validation and ticket printing.

12. The gaming system of claim 9, wherein the PoE connection point is further communicably connected to a gaming network and communicates money-handling information to the gaming network.

13. The gaming system of claim 9, wherein the PoE connection point is located in one of the plurality of gaming machine.

14. A computer-implemented method of operating a Power-over-Ethernet (PoE) connection communicably connected to a gaming machine, the gaming machine being powered by a first power source and the PoE connection point being powered by a second power source, the method comprising:

presenting, via one or more processors of the gaming machine, a wagering game that includes receiving a wager;

performing, via at least one PoE device communicably connected to and receiving power from the PoE connection point, money-handling operations for the wagering game and communicating money-handling information, via the PoE connection point over a communication connection to at least one of the one or more processors, while the one or more processors are powered by the first power source; and in response to a failure of the first power source, performing, via the at least one PoE device, at least a part of the money-handling operations and communicating, via the at least one PoE device, money-handling information to the PoE connection point.

15. The method of claim 14, wherein the PoE connection point receives communications that are destined for the host computer from the at least one PoE device.

16. The method of claim 14, wherein the money-handling operations include at least one of currency validation and ticket printing.

17. The method of claim 14, wherein the PoE connection point is further communicably connected to a gaming network and communicates money-handling information to the gaming network.

* * * * *